(12) United States Patent
Ancimer et al.

(10) Patent No.: US 10,799,833 B2
(45) Date of Patent: Oct. 13, 2020

(54) SENSOR CONFIGURATION FOR AFTERTREATMENT SYSTEM INCLUDING SCR ON FILTER

(71) Applicant: Cummins Emission Solutions Inc., Columbus, IN (US)

(72) Inventors: Richard J. Ancimer, Toronto (CA); Michael J. Cunningham, Greenwood, IN (US); Michael Haas, Columbus, IN (US); Yuhui Zha, Columbus, IN (US); Mert Zorlu, Greenwood, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 255 days.

(21) Appl. No.: 15/748,972

(22) PCT Filed: Jul. 29, 2016

(86) PCT No.: PCT/US2016/044742
§ 371 (c)(1),
(2) Date: Jan. 30, 2018

(87) PCT Pub. No.: WO2017/023766
PCT Pub. Date: Feb. 9, 2017

(65) Prior Publication Data
US 2019/0001270 A1   Jan. 3, 2019

Related U.S. Application Data

(60) Provisional application No. 62/200,449, filed on Aug. 3, 2015.

(51) Int. Cl.
*B01D 53/94* (2006.01)
*F01N 3/20* (2006.01)
*F01N 3/023* (2006.01)

(52) U.S. Cl.
CPC ..... *B01D 53/9477* (2013.01); *B01D 53/9495* (2013.01); *F01N 3/023* (2013.01); *F01N 3/2066* (2013.01); *B01D 2251/208* (2013.01)

(58) Field of Classification Search
CPC ............ B01D 53/94; F01N 3/20; F01N 3/023
(Continued)

(56) References Cited

U.S. PATENT DOCUMENTS

2004/0065078 A1 *   4/2004   Schafer-Sindlinger ..................... B01D 53/944
60/295
2005/0031514 A1 *   2/2005   Patchett ................ F01N 3/2066
423/239.2

(Continued)

FOREIGN PATENT DOCUMENTS

CN       101298845 A       11/2008
CN       103124837 A       11/2008

(Continued)

OTHER PUBLICATIONS

International Search Report and Written Opinion issued for PCT/US2016/044742, dated Oct. 7, 2016, 9 pages.
(Continued)

*Primary Examiner* — Arlen Soderquist
(74) *Attorney, Agent, or Firm* — Foley & Lardner LLP

(57) ABSTRACT

An exhaust aftertreatment system includes a diesel oxidation catalyst in exhaust gas receiving communication with an engine. A selective catalytic reduction catalyst on filter (SCR on filter) is positioned downstream of the diesel oxidation catalyst. A hydrocarbon doser is configured to inject hydrocarbons into a flow of the exhaust gas upstream of the diesel oxidation catalyst. A reductant doser is configured to inject reductant into the flow of the exhaust gas upstream of the SCR on filter and downstream of the diesel oxidation catalyst. An aftertreatment controller is operatively coupled
(Continued)

to the hydrocarbon doser. The aftertreatment controller is configured to control a dosing rate at which the hydrocarbon doser injects hydrocarbons into the flow of the exhaust gas so as to cause regeneration of the SCR on filter.

21 Claims, 5 Drawing Sheets

(58) Field of Classification Search
USPC .......................................................... 422/110
See application file for complete search history.

(56) References Cited

U.S. PATENT DOCUMENTS

| | | | |
|---|---|---|---|
| 2007/0000238 A1* | 1/2007 | Marlett | F01N 3/0253 60/286 |
| 2008/0202107 A1* | 8/2008 | Boorse | B01D 53/9418 60/301 |
| 2009/0173063 A1* | 7/2009 | Boorse | B01D 53/9431 60/299 |
| 2009/0241653 A1* | 10/2009 | Wang | G01M 15/102 73/114.71 |
| 2010/0005791 A1* | 1/2010 | Ranganathan | F01N 3/36 60/310 |
| 2010/0026949 A1 | 2/2010 | Wu et al. | |
| 2010/0269491 A1 | 10/2010 | Boorse et al. | |
| 2010/0287915 A1 | 11/2010 | Zhan et al. | |
| 2011/0047971 A1* | 3/2011 | Mullins | F01N 3/208 60/274 |
| 2011/0203261 A1* | 8/2011 | Kotrba | F01N 3/0238 60/285 |
| 2011/0239627 A1* | 10/2011 | Sisken | F01N 3/208 60/276 |
| 2011/0258983 A1* | 10/2011 | Vosz | F01N 3/2892 60/274 |
| 2011/0271656 A1* | 11/2011 | Tan | F01N 3/0253 60/274 |
| 2011/0271657 A1* | 11/2011 | Tan | F01N 3/025 60/274 |
| 2012/0000187 A1* | 1/2012 | Mullins | F01N 3/023 60/277 |
| 2012/0121486 A1 | 5/2012 | Collier et al. | |
| 2012/0144801 A1* | 6/2012 | Levijoki | F01N 3/208 60/274 |
| 2013/0139490 A1* | 6/2013 | Tylutki | F01N 11/00 60/277 |
| 2014/0090362 A1* | 4/2014 | Eckhoff | F01N 3/0821 60/274 |
| 2014/0112853 A1* | 4/2014 | Mohanan | B01J 29/80 423/213.5 |
| 2014/0123630 A1* | 5/2014 | Eckhoff | F01N 3/035 60/274 |
| 2014/0311123 A1 | 10/2014 | Gonze et al. | |
| 2015/0086426 A1 | 3/2015 | Degeorge et al. | |
| 2015/0139859 A1* | 5/2015 | Butzke | B01D 53/94 422/110 |
| 2015/0198076 A1 | 7/2015 | Li et al. | |
| 2015/0240686 A1* | 8/2015 | Light-Holets | F01N 3/2066 60/274 |
| 2015/0275730 A1* | 10/2015 | Gupta | F01N 3/208 60/274 |
| 2015/0292378 A1* | 10/2015 | Tsukamoto | F01N 3/106 60/286 |
| 2015/0322837 A1* | 11/2015 | Takada | F01N 3/106 422/111 |
| 2015/0330275 A1* | 11/2015 | Mikami | F01N 3/106 60/285 |
| 2015/0345359 A1* | 12/2015 | Iwatani | F01N 3/2066 60/286 |
| 2016/0208666 A1* | 7/2016 | DeGeorge | F01N 3/0232 |
| 2016/0326978 A1* | 11/2016 | Solomon | F02D 41/405 |
| 2017/0145893 A1* | 5/2017 | Kidokoro | B01D 46/0036 |
| 2017/0362984 A1* | 12/2017 | Li | B01J 23/10 |
| 2018/0328246 A1* | 11/2018 | Mikami | F01N 3/0814 |

FOREIGN PATENT DOCUMENTS

| | | |
|---|---|---|
| CN | 101443534 A | 5/2009 |
| CN | 104775883 A | 7/2015 |
| EP | 2 873 823 | 5/2015 |
| EP | 2870331 B1 | 9/2017 |
| GB | 2 477 630 B | 8/2011 |
| WO | WO-2013/145316 A1 | 10/2013 |
| WO | WO-2014/014399 | 1/2014 |
| WO | WO-2014/076815 | 5/2014 |
| WO | WO-2014/092159 | 6/2014 |
| WO | WO-2014/162597 | 10/2014 |

OTHER PUBLICATIONS

Examination Report issued in GB1801716.0, dated May 20, 2020, 3 pages.

* cited by examiner

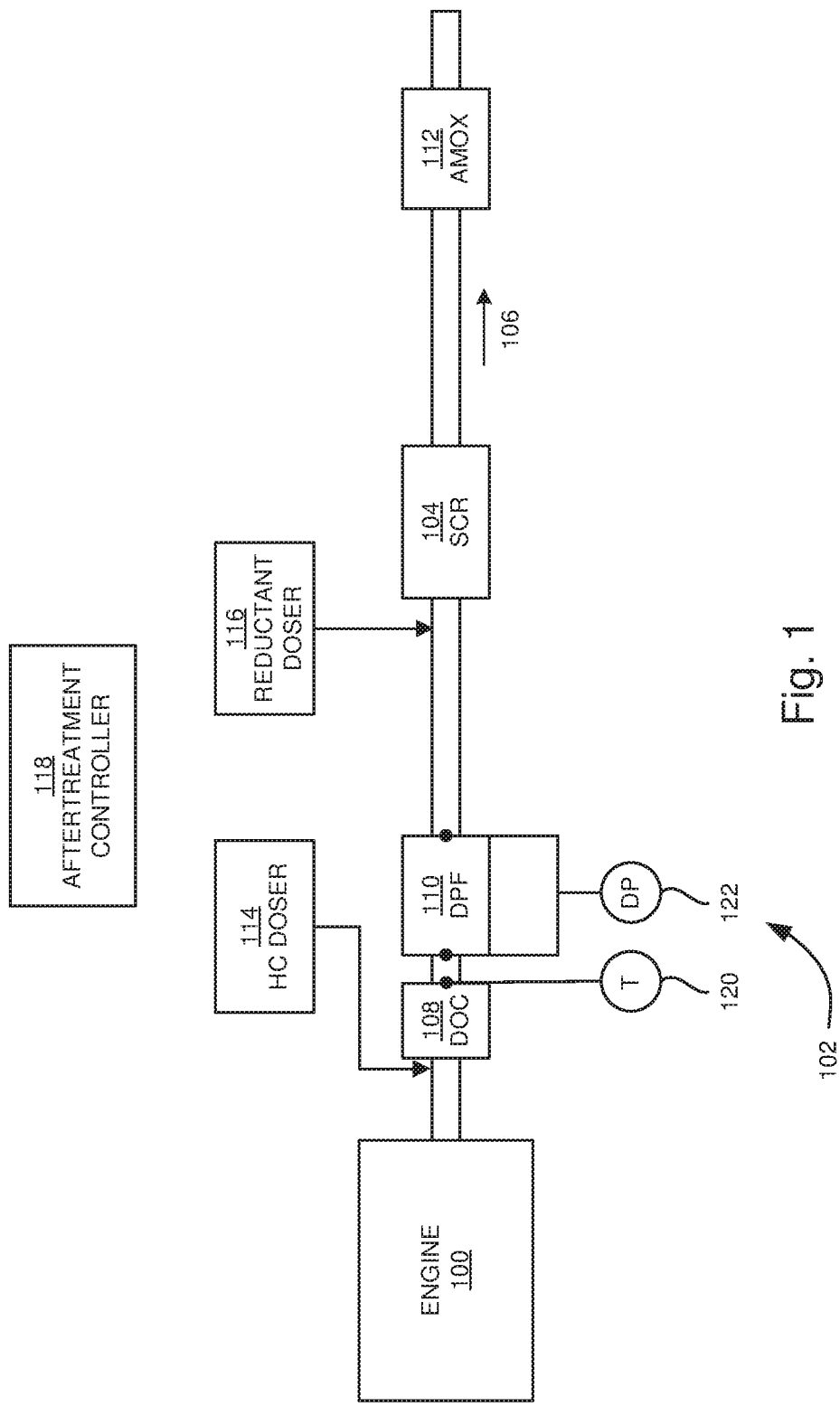

SENSOR CONFIGURATION FOR AFTERTREATMENT SYSTEM INCLUDING SCR ON FILTER

CROSS-REFERENCE TO RELATED APPLICATIONS

The present application is a National Stage of PCT Application No. PCT/US2016/044742, filed Jul. 29, 2016, which claims priority to U.S. Provisional Patent Application No. 62/200,449, filed Aug. 3, 2015. The contents of both applications are herein incorporated by reference in their entirety and for all purposes.

TECHNICAL FIELD

The present disclosure relates generally to the field of exhaust aftertreatment systems.

BACKGROUND

In general, regulated emissions for internal combustion engines include carbon monoxide (CO), hydrocarbons (HC), nitrogen oxides (NOx) and particulates. Such regulations have become more stringent over recent years. For example, the regulated emissions of $NO_x$ and particulates from diesel-powered engines are low enough that, in many cases, the emissions levels cannot be met with improved combustion technologies alone. To that end, exhaust after-treatment systems are increasingly utilized to reduce the levels of harmful exhaust emissions present in exhaust gas.

Conventional exhaust gas after-treatment systems include any of several different components to reduce the levels of regulated pollutants present in exhaust gas. For example, certain exhaust aftertreatment systems for diesel-powered engines include various components, such as a diesel oxidation catalyst (DOC), a selective catalytic reduction (SCR) catalyst, a diesel particulate filter (DPF), an SCR on filter and/or an ammonia slip catalyst (ASC) (also referred to as an ammonia oxidation catalyst (AMOX)). Each of the DOC, SCR catalyst, DPF, SCR on filter and the ASC components are configured to perform a particular exhaust emissions treatment operation on the exhaust gas passing through or over the respective components.

Generally, DOCs reduce the amount of CO and HCs present in the exhaust gas via oxidation techniques, as well as convert NO to $NO_2$ for passive regeneration of soot on a DPF and to facilitate fast SCR reactions. DPFs filter particulate matter, including soot, present in the exhaust gas. SCR catalysts and SCR on filter systems have been developed to remove $NO_x$ from the exhaust gas, which is relatively more difficult to remove than CO, HC and particulate matter.

SCR catalysts are configured to convert $NO_x$ (NO and $NO_2$ in some fraction) into nitrogen gas ($N_2$) and water vapor ($H_2O$). A reductant (typically ammonia ($NH_3$) in some form) is added to the exhaust gas upstream of the catalyst. The $NO_x$ and $NH_3$ pass over the catalyst and a catalytic reaction takes place in which $NO_x$ and $NH_3$ are converted into $N_2$ and $H_2O$. An SCR on filter is an assembly that performs the combined functions of an SCR and a DPF.

In many conventional SCR and SCR on filter systems, $NH_3$ is used as a reductant. Typically, pure $NH_3$ is not directly used due to safety concerns, expense, weight, lack of infrastructure, and other factors. Instead, many conventional systems utilize diesel exhaust fluid (DEF), which typically is a urea-water solution. To convert the DEF into $NH_3$, the DEF is injected into a decomposition tube through which an exhaust stream flows. The injected DEF spray is heated by the exhaust gas stream to vaporize the urea-water solution and trigger the decomposition of urea into $NH_3$. The exhaust gas mixture, including the $NH_3$ decomposed from the urea, further mixes while flowing through the decomposition tube and passes over the SCR catalyst, where the $NO_x$ and $NH_3$ are converted primarily to $N_2$ and $H_2O$.

SUMMARY

Various embodiments relate to exhaust aftertreatment systems. One example exhaust aftertreatment system includes an oxidation catalyst in exhaust gas receiving communication with an engine. A selective catalytic reduction catalyst on filter is positioned downstream of the oxidation catalyst. A hydrocarbon doser is configured to inject hydrocarbons into a flow of the exhaust gas upstream of the oxidation catalyst. A reductant doser is configured to inject reductant into the flow of the exhaust gas upstream of the SCR on filter and downstream of the oxidation catalyst. An aftertreatment controller is operatively coupled to the hydrocarbon doser. The aftertreatment controller is configured to control a dosing rate at which the hydrocarbon doser injects hydrocarbons into the flow of exhaust gas to cause regeneration of the SCR on filter.

In some implementations, the system further includes a first temperature sensor positioned proximate an outlet of the oxidation catalyst and a second temperature sensor positioned proximate an inlet of the SCR on filter. The first temperature sensor and the second temperature sensor in operative communication with the aftertreatment controller. The controller is further configured to determine a first temperature measurement value via operative communication with the first temperature sensor, and a second temperature measurement value via operative communication with the second temperature sensor. The controller is also configured to determine an error between the second temperature measurement value and an SCR on filter target regeneration temperature and adjust an oxidation catalyst outlet target temperature to minimize the error. In some implementations, the controller is further configured to determine a third temperature measurement value via operative communication with the second temperature sensor with the third temperature measurement value being equal to the first temperature measurement value. The controller is further configured to determine a lag time between a first time at which the first temperature measurement value is determined and a second time at which the third temperature measurement value is determined and to determine a reductant deposit value based on the lag time. In some implementations, the dosing rate of the hydrocarbon doser is controlled to cause the first temperature measurement value to equal the oxidation catalyst outlet target temperature. In some implementations, the dosing rate of the hydrocarbon doser is further based on a mass flow rate of the exhaust gas or an ambient temperature. In some implementations, the reductant comprises diesel exhaust fluid. In some implementations, the hydrocarbon doser is configured to inject the hydrocarbons into a cylinder of the engine. In some implementations, the aftertreatment controller is further configured to detect a formation of solid reductant deposits within the exhaust aftertreatment system. In some implementations, the system further includes a first delta pressure sensor positioned across the SCR on filter and in operative communication with the aftertreatment controller. The controller is further configured to determine a first delta pressure measurement value via operative communication with the first delta pressure sensor and determine a soot loading value based on the first delta pressure measurement value. In some implementations, the system further includes a second delta pressure sensor positioned across a portion of the exhaust aftertreatment system containing the reductant doser and in operative communication with the aftertreatment controller. The controller is further configured to determine a second delta pressure measurement value via operative communication with the second delta pressure sensor and determine a reductant deposit value based on the second delta pressure measurement value.

Another implementations relates to an aftertreatment controller that includes a filter regeneration circuit. The filter regeneration circuit is configured to determine a first temperature measurement value via operative communication with a first temperature sensor and a second temperature measurement value via operative communication with a second temperature sensor. The first temperature sensor is positioned proximate an outlet of an oxidation catalyst and the second temperature sensor is positioned proximate an inlet of an SCR on filter. The filter regeneration circuit is further configured to determine an error between the second temperature measurement value and an SCR on filter target regeneration temperature and to adjust an oxidation catalyst outlet target temperature to minimize the error. The filter regeneration circuit is further configured to control a dosing rate at which a hydrocarbon doser injects hydrocarbons into a flow of exhaust gas to cause regeneration of the SCR on filter based on the adjusted oxidation catalyst outlet target temperature.

In some implementations, the aftertreatment controller further includes a DEF deposit detection circuit. The DEF deposit detection circuit is configured to determine a third temperature measurement value via operative communication with the second temperature sensor. The third temperature measurement value being equal to the first temperature measurement value. The DEF deposit detection circuit is configured to determine a lag time between a first time at which the first temperature measurement value is determined and a second time at which the third temperature measurement value is determined and to determine a reductant deposit value based on the lag time. In some implementations, the dosing rate of the hydrocarbon doser is controlled to cause the first temperature measurement value to equal the oxidation catalyst outlet target temperature. In some implementations, the dosing rate of the hydrocarbon doser is further based on a mass flow rate of the exhaust gas or an ambient temperature. In some implementations, the aftertreatment controller further includes a soot load circuit. The soot load circuit is configured to determine a first delta pressure measurement value via operative communication with a first delta pressure sensor, with the first delta pressure sensor being positioned across the SCR on filter. The soot load circuit is further configured to determine a soot loading value based on the first delta pressure measurement value. In some implementations, the aftertreatment controller includes a DEF deposit detection circuit. The DEF deposit detection circuit is configured to determine a second delta pressure measurement value via operative communication with a second delta pressure sensor, the second delta pressure sensor being positioned across a portion of the exhaust aftertreatment system containing the reductant doser. The DEF deposit detection circuit is further configured to determine a reductant deposit value based on the second delta pressure measurement value.

Yet another implementation relates to an exhaust aftertreatment system includes an oxidation catalyst, a selective catalytic reduction catalyst on filter, a hydrocarbon doser, a first temperature sensor, a second temperature sensor, and an aftertreatment controller. The oxidation catalyst is in exhaust gas receiving communication with an engine. The selective catalytic reduction catalyst on filter (SCR on filter) is positioned downstream of the oxidation catalyst. The hydrocarbon doser is configured to inject hydrocarbons into a flow of the exhaust gas upstream of the oxidation catalyst. The first temperature sensor is positioned proximate an outlet of the oxidation catalyst. The second temperature sensor is positioned proximate an inlet of the SCR on filter. The aftertreatment controller is operatively coupled to the hydrocarbon doser, the first temperature sensor and the second temperature sensor. The aftertreatment controller is configured to determine a first temperature measurement value via operative communication with the first temperature sensor and a second temperature measurement value via operative communication with the second temperature sensor. The aftertreatment controller is further configured to determine an error between the second temperature measurement value and an SCR on filter target regeneration temperature and to adjust an oxidation catalyst outlet target temperature to minimize the error. The aftertreatment controller is further configured to control a dosing rate at which the hydrocarbon doser injects hydrocarbons into the flow of exhaust gas to cause regeneration of the SCR on filter based on the adjusted oxidation catalyst outlet target temperature.

In some implementations, the system further includes a first delta pressure sensor positioned across the SCR on filter and a second delta pressure sensor positioned across a portion of the exhaust aftertreatment system containing a reductant doser. The first delta pressure sensor and the second delta pressure sensor are in operative communication with the aftertreatment controller. The aftertreatment controller is further configured to determine a first delta pressure measurement value via operative communication with the first delta pressure sensor, determine a soot loading value based on the first delta pressure measurement value, determine a second delta pressure measurement value via operative communication with the second delta pressure sensor, and determine a reductant deposit value based on the second delta pressure measurement value.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIG. 1 is a schematic diagram illustrating an engine and an exhaust aftertreatment system including an SCR catalyst.

DETAILED DESCRIPTION

Figure 2A:
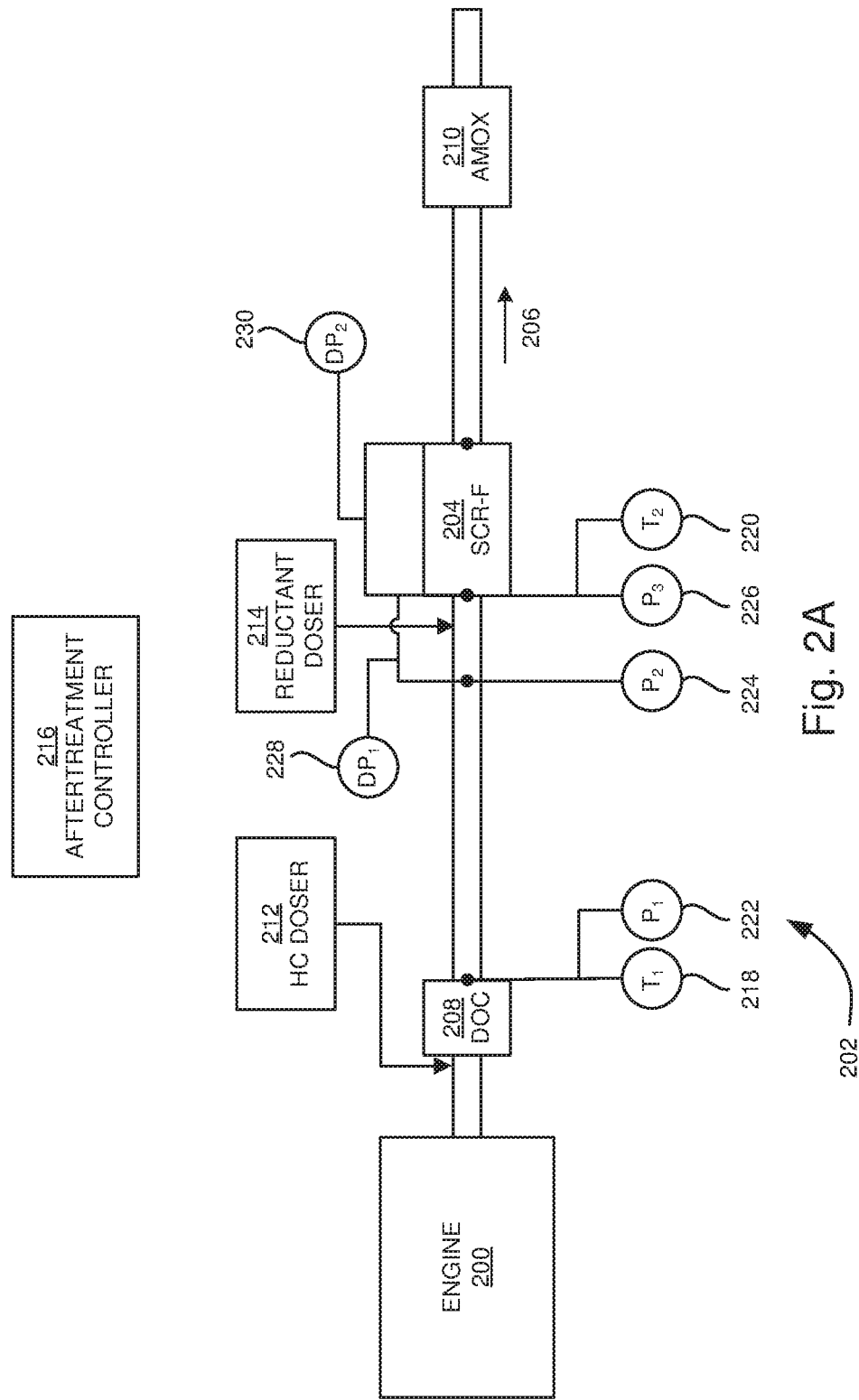
FIG. 2A is a schematic diagram illustrating an engine and an exhaust aftertreatment system including an SCR on filter, according to an embodiment.

An SCR on filter is an exhaust aftertreatment component technology that integrates the functionality of particulate matter filtration (e.g., conventionally performed by a DPF) and $NO_x$ reduction (e.g., conventionally performed by an SCR catalyst) into a single SCR on filter unit. Incorporating SCR on filter units into exhaust aftertreatment systems affects various aspects of the systems, including system architecture and control strategy. For example, aftertreatment control systems manage various functionalities, such as reductant (e.g., DEF) dosing, SCR/SCR on filter performance diagnostics, DPF/SCR on filter temperature control for regeneration, soot load estimation (SLE), DEF deposit detection, $NH_3$ slip detection, etc. However, different sensor configurations and control strategies are needed for aftertreatment systems that include an SCR on filter unit versus conventional aftertreatment systems that include a DPF and an SCR catalyst.

FIG. 1 is a schematic diagram illustrating an engine 100 and an exhaust aftertreatment system 102 including an SCR catalyst 104. Generally, the exhaust aftertreatment system 102 is configured to remove regulated pollutants present in the exhaust gas. The exhaust aftertreatment system 102 is in exhaust gas communication with the engine 100. Several exhaust aftertreatment components are positioned within an exhaust flow path 106 defined by the exhaust aftertreatment system 102. For example, as illustrated in FIG. 1, the exhaust aftertreatment system 102 includes a DOC 108, a DPF 110, the SCR catalyst 104, and an AMOX catalyst 112 arranged in that order along the exhaust flow path 106, with the DOC 108 being furthest upstream (closest to the engine 100) and the AMOX catalyst 112 being furthest downstream (furthest from the engine 100). In other words, exhaust gas flows from the engine 100 through the DOC 108, then through the DPF 110, then through the SCR catalyst 104, and finally through the AMOX catalyst 112.

Generally, DPFs include filter surfaces (e.g., ceramic or sintered metal) to remove particulate matter such soot particles from the exhaust gas. From time to time, particulate matter builds up in the DPF and must be cleaned out. In other words, the DPF must be "regenerated." DPFs are regenerated by oxidizing (i.e., burning off) the particulates that have collected in the filter. The carbon particles within the particulates are oxidized with oxygen present in the exhaust gas to form $CO_2$. In general, temperatures above 500 degrees C. are needed to achieve significant rates of particulate oxidation with oxygen, the rate of oxidation being strongly dependent on temperature and the amount of precious metal impregnated on the DPF. In addition, soot particles are oxidized with $NO_2$ (e.g., generated by the DOC or within a catalyzed DPF) at lower temperatures (e.g., approximately 200-450 degrees C.).

The temperatures required for regeneration with oxygen are typically not reached during normal vehicle operation. Therefore, various control strategies can be implemented to initiate "active" regeneration by raising the exhaust gas temperature. For example, active regeneration can be initiated by injecting HCs (e.g., diesel fuel, gasoline, etc.) into the exhaust gas stream (e.g., secondary or post injection), throttling intake air, adjusting the exhaust gas recovery (EGR) rate, injecting excess fuel, and by utilizing electric heating systems, among other ways. For example, in some systems, a DOC can act as a "catalytic burner" by triggering an exothermic reaction with unburned HCs in the exhaust gas stream, thereby increasing the temperature of the exhaust gas entering the DPF.

The exhaust aftertreatment system 102 also includes an HC doser 114 and a reductant doser 116. The HC doser 114 is configured to inject HCs into the exhaust flow path 106 upstream of the DOC 108. The injected HCs are configured to oxidize over the DOC 108 to raise the temperature of the exhaust gas passing therethrough. The temperature of the exhaust gas is raised periodically in order to induce active regeneration of the DPF 110.

The exhaust aftertreatment system further includes an electronic aftertreatment controller 118 in operative communication with various sensors, such as a temperature sensor 120, and differential pressure sensor 122. Other embodiments may further include additional sensors, such as, for example gauge and/or absolute pressure sensors, $NO_x$ sensors, $NH_3$ sensors, $O_2$ (lambda) sensors, flow rate sensors, etc. As shown in FIG. 1, the temperature sensor 120 is positioned at an outlet of the DOC 108, and the differential pressure sensor 122 is positioned across the DPF 110. Other configurations may use more or fewer sensors in the same or different arrangement as shown in FIG. 1. For example, some configurations may utilize mid-bed temperature sensors instead of inlet and/or outlet temperature sensors, or two pressure sensors instead of a differential pressure sensor.

The aftertreatment controller 118 may be configured to control active regeneration of the DPF 110. As mentioned above, active regeneration generally occurs on the DPF 110 at temperatures above approximately 400-500 degrees C. The temperature of the DPF 110 is dependent upon the temperature of the exhaust gas entering the DPF 110. The DOC 108 can trigger an exothermic reaction with unburned HCs in the exhaust gas stream (e.g., injected by the HC doser 114), thereby increasing the temperature of the exhaust gas entering the DPF.

FIG. 2A is a schematic diagram illustrating an engine 200 and an exhaust aftertreatment system 202 including an SCR on filter 204, according to an embodiment. The engine 200 can be compression-ignited engine or spark-ignited, and can be powered by any of various fuels, such as diesel, natural gas, gasoline, etc. Generally, the exhaust aftertreatment system 202 is configured to remove various regulated emissions present in the exhaust gas.

The exhaust aftertreatment system 202 is fluidly coupled to (e.g., in exhaust gas communication with) the engine 200. Several exhaust aftertreatment components are positioned within an exhaust flow path 206 defined by the exhaust aftertreatment system 202. For example, as illustrated in FIG. 2A, the exhaust aftertreatment system 202 includes a DOC 208, the SCR on filter 204, and an AMOX catalyst 210 arranged in that order along the exhaust flow path 206, with the DOC 208 being furthest upstream (closest to the engine 200) and the AMOX catalyst 210 being furthest downstream (furthest from the engine 200). In other words, exhaust gas flows from the engine 200 through the DOC 208, then through the SCR on filter 204, and finally through the AMOX catalyst 112. The DOC 208 may be a diesel oxidation catalyst or another type of oxidation catalyst.

The exhaust aftertreatment system 202 also includes an HC doser 212 and a reductant doser 214. In the embodiment depicted in FIG. 2A, the reductant doser 214 is a DEF doser configured to inject or insert DEF into the exhaust flow path 206. It should be understood that other embodiments may utilize pure $NH_3$ or reductants other than DEF. The HC doser 212 may be mounted to an exhaust pipe that defines the exhaust flow path 206. In one embodiment, the HC doser 212 is configured to inject HCs into the exhaust flow path 206 upstream of the DOC 208. The injected HCs are configured to oxidize over the DOC 208 to raise the temperature of the exhaust gas passing therethrough. The temperature of the exhaust gas is raised periodically in order to induce active regeneration of the SCR on filter 204.

In some embodiments, in-cylinder dosing may be used instead of HC dosing via the HC doser 212 to raise the temperature of the exhaust gas in order to induce active regeneration of the SCR on filter 204. In-cylinder dosing refers to causing the fuel injectors to inject a dose of fuel into the cylinder(s) of the engine 200 after primary combustion has occurred. Unburned fuel is exhausted out of the cylinder and through the exhaust flow path 206. Similar to the above, the excess fuel is configured to oxidize over the DOC 208 to raise the temperature of the exhaust gas passing therethrough. The heated exhaust gas is configured to induce active regeneration of the SCR on filter 204. Any systems and methods described herein including HC dosing via the HC doser 212 may also similarly be applied using in-cylinder dosing.

The exhaust aftertreatment system 202 further includes an aftertreatment controller 216 communicably coupled to the aftertreatment system 202. Communication between and among the components may be via any number of wired or wireless connections. For example, a wired connection may include a serial cable, a fiber optic cable, a CATS cable, or any other form of wired connection. In comparison, a wireless connection may include the Internet, Wi-Fi, cellular, radio, etc. In one embodiment, a controller area network ("CAN") bus provides the exchange of signals, information, and/or data. The CAN bus includes any number of wired and wireless connections. Because the controller 216 is communicably coupled to the systems and components in the aftertreatment system 202, the controller 216 is structured to receive data from one or more of the components shown in FIG. 2A. The system operating data may be received via one or more sensors (e.g., first and second temperature sensors 218, 220, and first, second, third, and fourth pressure sensors 222, 224, 226, 228) or other sensors attached to the components of FIG. 2A. As described more fully herein, due to the integration of the controller 216 with the components of FIG. 2A, the controller 216 can acquire this data to dynamically adjust the HC dosing of the HC doser 212 to substantially achieve various operating characteristics of one or more system operating parameters, such as active regeneration of the SCR on filter 204.

As the components of FIG. 2A are shown to be embodied in the aftertreatment system 202, the controller 216 may be structured as an electronic control module ("ECM"). The ECM may include an engine control unit and any other control unit included in a vehicle (e.g., transmission control unit, powertrain control unit, etc.).

As mentioned briefly above, the aftertreatment system 202 includes first and second temperature sensors 218, 220, first, second, and third pressure sensors 222, 224, 226, and first and second differential pressure sensors 228, 230. Other embodiments may further include additional sensors, such as $NO_x$ sensors and $NH_3$ sensors, for example. As shown in FIG. 2, the first temperature sensor 218 and the first pressure sensor 222 are positioned at an outlet of the DOC 208; the second pressure sensor 224 is positioned upstream of the reductant doser 214; the second temperature sensor 220 and the third pressure sensor 226 are positioned at an inlet of the SCR on filter 204; the first differential pressure sensor 228 is positioned across the reductant doser 214, and the second differential pressure sensor 230 is positioned across the SCR on filter 204. The first, second, and third pressure sensors 222, 224, 226 may be gauge or absolute pressure sensors. In other embodiments, the sensors may be positioned and configured differently than those shown in FIG. 2A. Some embodiments include more or fewer sensors than those shown in FIG. 2A. Some embodiments may not include the second temperature sensor 220 and instead may infer the temperature at the inlet of the SCR on filter 204 based on measurements from the first temperature sensor 218 positioned at the outlet of the DOC 208. Some embodiments may include a pressure sensor (e.g., a gauge or absolute pressure sensor) at the outlet of the SCR on filter instead of or in addition to the third pressure sensor 226. Furthermore, some embodiments may include mid-bed sensors instead of one or both of the inlet and outlet sensors. For example, one embodiment may include a mid-bed SCR on filter 204 temperature sensor embedded within the catalyst bed of the SCR on filter 204 instead of the second temperature sensor 220.

Figure 2B:
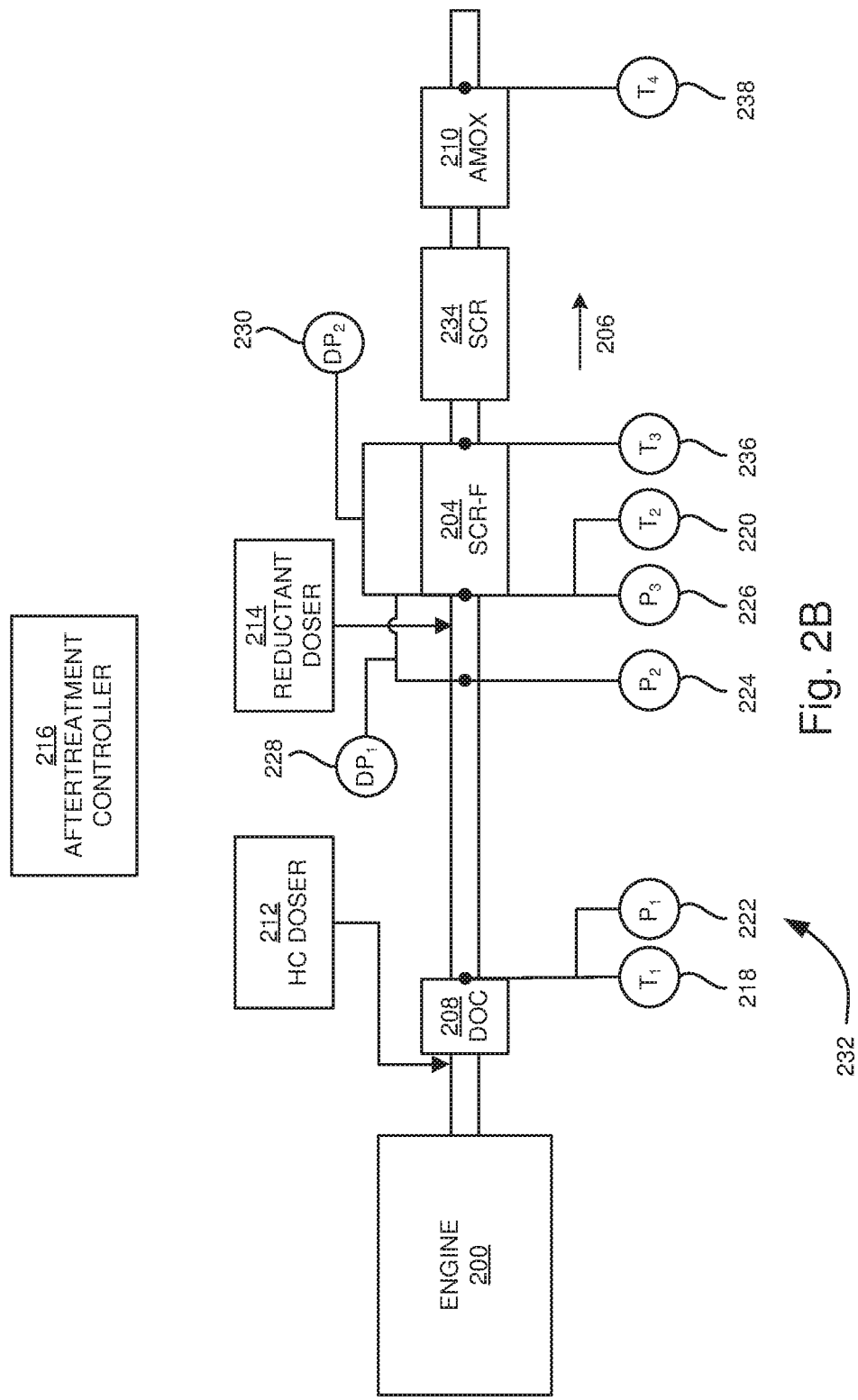
FIG. 2B is a schematic diagram illustrating an exhaust aftertreatment system, according to an alternative embodiment of the exhaust aftertreatment system of FIG. 2A.

FIG. 2B is a schematic diagram illustrating an exhaust aftertreatment system 232, which is an alternative embodiment of the exhaust aftertreatment system 202 of FIG. 2A. The exhaust aftertreatment system 232 of FIG. 2B is similar to the exhaust aftertreatment system 202 of FIG. 2A. However, the exhaust aftertreatment system 232 of FIG. 2B further includes an SCR catalyst 234 positioned downstream of the SCR on filter 204 and upstream of the AMOX catalyst 210. The exhaust aftertreatment system 232 further includes a third temperature sensor 236 positioned at the outlet of the SCR on filter 204, and a fourth temperature sensor positioned at the outlet of the AMOX catalyst 210. In an alternative embodiment, the SCR catalyst 234 is positioned upstream of the SCR on filter 204. In this arrangement, a temperature sensor may be included between the SCR catalyst 234 and the SCR on filter 204.

Figure 3:
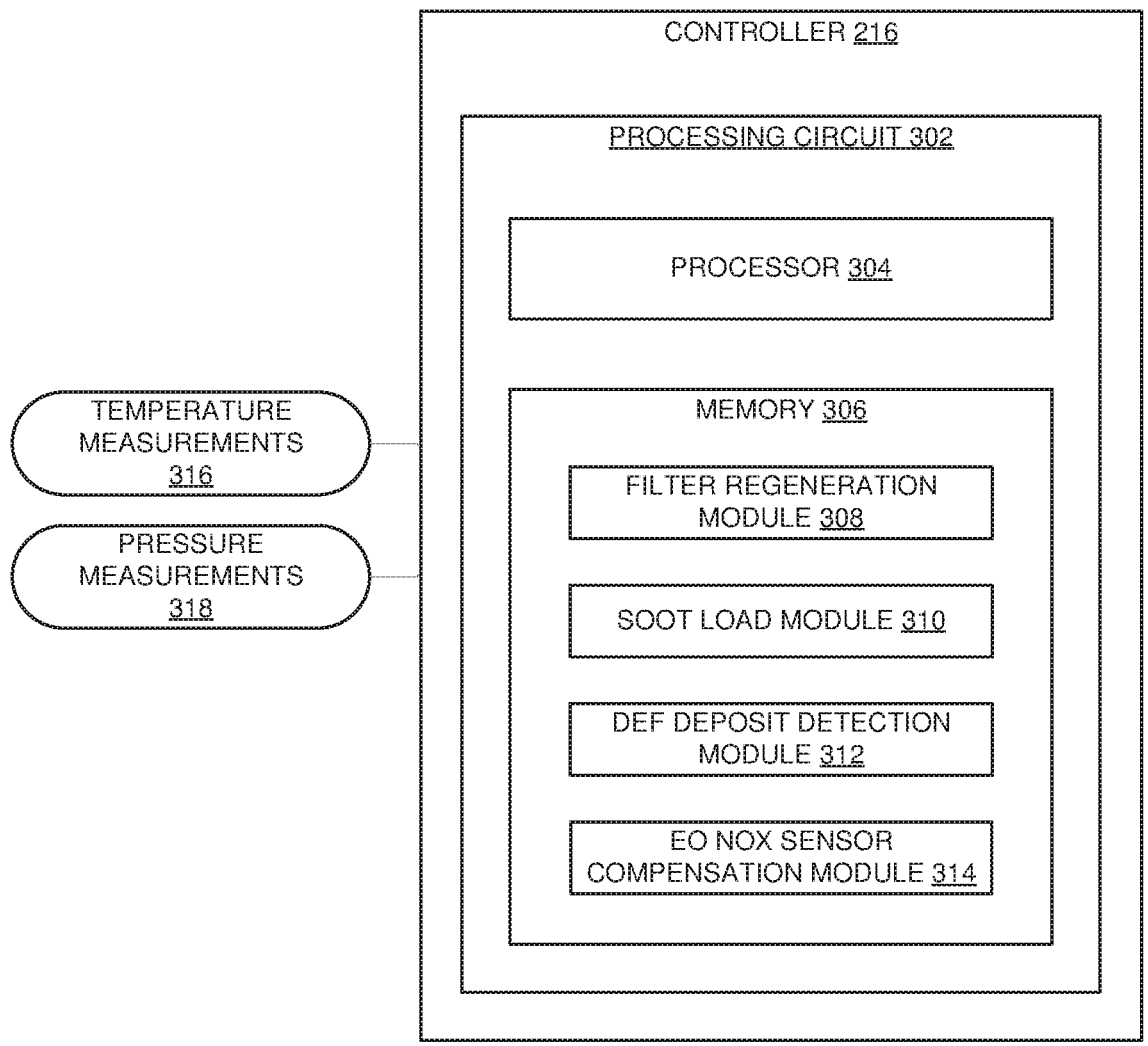
FIG. 3 is a block diagram illustrating the function and structure of the aftertreatment controller of FIGS. 2A and 2B, according to an embodiment.

FIG. 3 is a block diagram illustrating the function and structure of the aftertreatment controller 216 of FIGS. 2A and B, according to an embodiment. The controller 216 includes a processing circuit 302 including a processor 304 and a memory 306. The memory 306 may store data and/or computer code for facilitating the various processes described herein. Thus, the memory 306 may be communicably connected to the controller 216 and provide computer code or instructions to the controller 216 for executing the processes described in regard to the controller 216 herein. Moreover, the memory 306 may be or include tangible, non-transient volatile memory or non-volatile memory.

The memory 306 is shown to include various modules for completing the activities described herein. More particularly, the memory 306 includes a filter regeneration module 308, a soot load module 310, a DEF deposit detection module 312, and an engine-out (EO) $NO_x$ sensor compensation module 314. While various modules with particular functionality are shown in FIG. 3, it should be understood that the controller 216 and memory 306 may include any number of modules for completing the functions described herein. For example, the activities of multiple modules may be combined as a single module, as additional modules with additional functionality may be included, etc. Further, it should be understood that the controller 216 may further control other vehicle activity beyond the scope of the present disclosure.

Certain operations of the controller 216 described herein include operations to interpret and/or to determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value. For example, the aftertreatment controller 216 may receive temperature measurement signals 316 from any of the first and second temperature sensors 218, 220, and to determine the corresponding temperature measurement values based on the respective temperature measurement signals. Similarly, the aftertreatment controller 216 may receive pressure measurement signals 318 from any of the first, second, third, pressure sensors 222, 224, 226, as well as differential pressure measurement signals from any of the first and second differential pressure sensors 228, 230, and determine the corresponding pressure measurement values based on the respective pressure and differential pressure measurement signals.

The filter regeneration module 308 is structured to control active regeneration of the SCR on filter 204. Similar to the DPF 110 of FIG. 1, active regeneration generally occurs on the SCR on filter 204 at temperatures above approximately 400-500 degrees C. The temperature of the SCR on filter 204 is dependent upon the temperature of the exhaust gas entering the SCR on filter 204. The temperature of the exhaust gas may be controlled in various ways. For example, the exhaust gas temperature may be controlled by injecting HCs into the exhaust gas stream (e.g., secondary or post injection), among other ways. For example, in some systems, the DOC 208 can trigger an exothermic reaction with unburned HCs in the exhaust gas stream (e.g., injected by the HC doser 212), thereby increasing the exhaust gas temperature.

Filter regeneration control strategies are different for the exhaust aftertreatment system 202 of FIGS. 2A and 2B including the SCR on filter 204 than those of the exhaust aftertreatment system 102 of FIG. 1 including the SCR catalyst 104. In the exhaust aftertreatment system 102 of FIG. 1, the DOC 108 outlet is proximate the DPF 110 inlet, so the DOC 108 outlet temperature is approximately equal to the DPF 110 inlet temperature. Therefore, the aftertreatment controller 118 can use the monitored DOC 108 outlet temperature (e.g., via operative communication with the temperature sensor 120) as a control parameter to control HC dosing from the HC doser 114 to achieve a target DPF 110 regeneration temperature.

In contrast, in the aftertreatment system 202 of FIGS. 2A and 2B, the DOC 208 outlet is not proximate the SCR on filter 204 (the particulate filter) inlet. For example, a DEF decomposition tube (not shown) must lie between the DOC outlet and SCR on filter inlet. The DEF decomposition configuration can be designed to be compact or non-compact. In both situations, because the DOC 208 outlet is not proximate the SCR on filter 204, the temperature of the exhaust gas may drop between the DOC 208 outlet and the SCR on filter 204 inlet. The difference would be more significant in a non-compact configuration. Therefore, the measured DOC 208 outlet temperature may be insufficient to be used to accurately control HC dosing from the HC doser 114 in order to control regeneration of the SCR on filter 204. In addition to the temperature drop, the spacing between the DOC 208 and the SCR on filter 204 causes an inherent time lag in controlling HC dosing upstream of the DOC 208 to achieve an SCR on filter 204 target regeneration temperature, based on the mass flow rate of the exhaust gas in the exhaust flow path 206.

According to various embodiments, the filter regeneration module 308 controls regeneration of the SCR on filter 204 based on one or both of the DOC 208 outlet temperature and the SCR on filter 204 inlet temperature. The aftertreatment controller 216 is structured to determine the DOC 208 outlet temperature value via operative communication with the first temperature sensor 218. The aftertreatment controller 216 is also structured to determine the SCR on filter 204 inlet temperature via operative communication with the second temperature sensor 220.

The filter regeneration module 308 controls HC dosing from the HC doser 212 based on two target temperatures: a DOC 208 outlet target temperature and an SCR on filter 204 target regeneration temperature. More specifically, the DOC 208 outlet target temperature is a dynamic target that is adjusted based on a measured error between the SCR on filter 204 inlet temperature and the target regeneration temperature. Accordingly, the dynamically adjusted DOC 208 outlet target temperature compensates for the temperature drop between the DOC 208 outlet and the SCR on filter 204 inlet. In operation, HC dosing from the HC doser 212 is dynamically adjusted, based on the dynamically adjusted DOC 208 outlet target temperature, so as to cause the SCR on filter 204 inlet temperature to equal the target regeneration temperature.

The filter regeneration module 308 may also control HC dosing from the HC doser 212 based on the exhaust mass flow rate to account for the time lag between HC dosing and its corresponding effect on the SCR on filter 204 inlet temperature. In some embodiments, the filter regeneration module 308 further compensates for variations in ambient temperature. For example, an adaptive time scale, which may range from tens of minutes to a number of hours, may be used to monitor and account for changes in ambient temperature, which may also affect the SCR on filter 204 inlet temperature.

In another embodiment, the filter regeneration module 308 controls regeneration of the SCR on filter 204 based on one of the DOC 208 outlet temperature and the SCR on filter 204 inlet temperature, and a model configured to predict the temperature drop and lag between the DOC 208 outlet and the SCR on filter 204 inlet. The model is configured to estimate ambient heat losses as well as the thermal lag due to heating and cooling of the exhaust gas in the exhaust flow path 206 between the DOC 208 outlet and the SCR on filter 204 inlet, and the effect of DEF vaporization. In one embodiment, the filter regeneration module 308 is configured to predict the SCR on filter 204 inlet temperature based on the measured DOC 208 outlet temperature value via operative communication with the first temperature sensor 218. In another embodiment, the filter regeneration module 308 is configured to predict the DOC 208 outlet temperature based on the measured SCR on filter 204 inlet temperature via operative communication with the second temperature sensor 220.

The soot load module 310 is structured to detect the amount of soot collected on the SCR on filter 204. In operation, the filter portion of the SCR on filter 204 collects particulate matter such as soot from the exhaust gas, which can cause an increase in exhaust back pressure. Soot loading can be used, for example, to trigger regeneration of the SCR on filter 204 via the filter regeneration module 308.

According to various embodiments, the soot load module 310 is configured to determine a delta pressure-based soot load estimate (DPSLE) based on a measured differential pressure across the SCR on filter 204. The differential pressure across the SCR on filter 204 may be calculated by the soot load module 310 via operative communication with the second differential pressure sensor 230.

The DEF deposit detection module 312 is structured to detect the formation of solid DEF deposits on the inner walls of the exhaust passage and/or the decomposition tube (not shown). DEF deposits may form due to inadequate decomposition and mixing of injected DEF. For example, low temperature regions within the exhaust flow path 206 may result in inadequate mixing or decomposition, which may lead to the formation of solid DEF deposits. DEF deposits may also form due to DEF spray being deflected away from an intended target. The formation of solid DEF deposits may result in a lower amount of $NH_3$ concentration and lower $NH_3$ distribution uniformity at the inlet face of the SCR on filter 204, which can degrade the performance and control of the SCR on filter 204. Additionally, solid DEF deposits can increase exhaust backpressure within the aftertreatment system 202, which can adversely impact the performance of the engine 200 and aftertreatment system 202. Upon detecting DEF deposits, the aftertreatment controller 216 may perform clean-out or regeneration procedures to remove the DEF deposits.

DEF deposit detection strategies are different for the exhaust aftertreatment system 202 of FIGS. 2A and 2B including the SCR on filter 204 than those of the exhaust aftertreatment system 102 of FIG. 1 including the SCR catalyst 104. For example, for the exhaust aftertreatment system 102 of FIG. 1, the absolute pressure at the DPF 110 outlet (e.g., via operative communication with the differential pressure sensor 122) is conventionally used to detect DEF deposits. However, for the exhaust aftertreatment system 202 of FIGS. 2A and 2B, the primary differential pressure sensor—the second differential pressure sensor 230—is downstream of potential DEF deposit formations. To that end, in some embodiments, the DEF deposit detection module 312 may further consider a differential pressure across the reductant doser 214 via operative communication with the first differential pressure sensor 228. The DEF deposit detection module 312 may further use an EFA model to account for an expected pressure loss through the DEF dosing system. Alternatively, the DEF deposit detection module 312 may consider an absolute pressure directly upstream of the reductant dosing system 214 via operative communication with the second pressure sensor 224. This pressure, in combination with differential pressure measurement across the SCR on filter 204, could be used to determine whether a significant DEF deposit is present.

The DEF deposit detection module 312 may further monitor a correlation between the DOC 208 outlet temperature and the SCR on filter 204 inlet temperature. The lag between the DOC 208 outlet temperature and the SCR on filter 204 inlet temperature may be indicative of DEF deposit formation. In an embodiment, if the lag exceeds a predetermined value, the aftertreatment controller 216 may perform clean-out or regeneration procedures to remove the DEF deposits. In some embodiments, the pressure differential across the entire aftertreatment system 202 is analyzed in addition to the temperature lag to detect DEF deposit formations.

The EO $NO_x$ sensor compensation module 314 is structured to adjust an EO $NO_x$ determination to account for various effects of the aftertreatment system 202 on $NO_x$ levels. EO $NO_x$ sensor compensation strategies are different for the exhaust aftertreatment system 202 of FIGS. 2A and 2B including the SCR on filter 204 than those of the exhaust aftertreatment system 102 of FIG. 1 including the SCR catalyst 104. For example, for the exhaust aftertreatment system 102 of FIG. 1, the absolute pressure at the DPF 110 outlet and/or the differential pressure across the DPF 110 (e.g., via operative communication with the differential pressure sensor 122) may be used for EO $NO_x$ sensor compensation. The differential pressure across the DOC 108 and the DOC 108 inlet cone is typically estimated based on the exhaust volumetric flow rate. The estimated differential pressure is used to compensate for the EO $NO_x$ sensor measurements.

However, for the exhaust aftertreatment system 202 of FIGS. 2A and 2B, the primary absolute or gauge pressure measurement is at the inlet of the SCR on filter 204, via operative communication with the third pressure sensor 226. Because the SCR on filter 204 is downstream of the reductant dosing system 214, the EO $NO_x$ sensor compensation module is configured to adjust the EO $NO_x$ determination to account for the reductant dosing system 214, as well as the inlet and outlet cones of the DOC 208, and the DOC 208 itself. In one embodiment, two EFA-based models are developed. A first EFA model is for the reductant dosing system 214, and a second EFA-based model is for the DOC 208, including its inlet and outlet cones. Absolute pressure is measured at the inlet of the SCR on filter 204 via the third pressure sensor 226, rather than the outlet. Measuring the absolute pressure at the inlet of the SCR on filter 204 reduces uncertainty versus measuring the absolute pressure at the outlet. The absolute pressure measurement is then used to compensate for the EO $NO_x$ sensor measurements.

Figure 4:
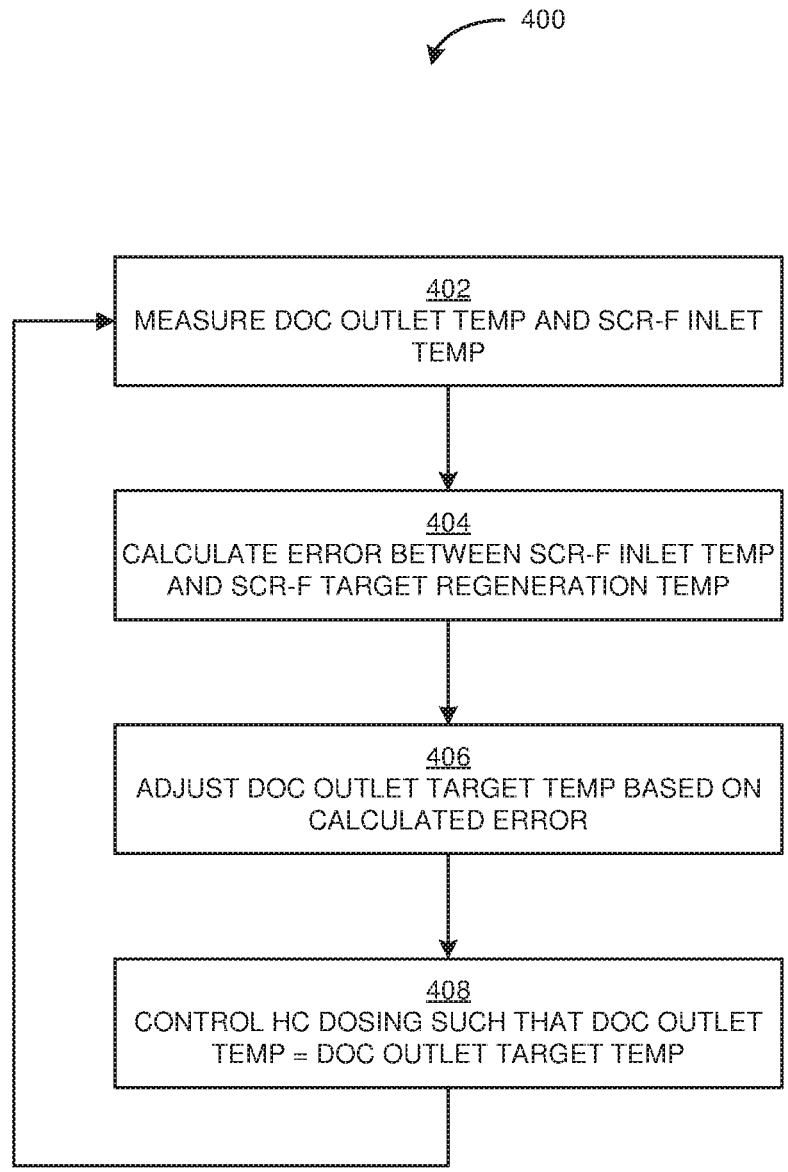
FIG. 4 is a flow diagram of a method of controlling active regeneration of an SCR on filter, according to an embodiment.

FIG. 4 is a flow diagram of a method of controlling active regeneration of an SCR on filter, according to an embodiment. The method 400 is described with respect to the exhaust aftertreatment system 202 of FIGS. 2A and 2B. However, the method 400 may similarly be performed by other exhaust aftertreatment systems.

At 402, the DOC 208 outlet temperature and the SCR on filter inlet temperature are measured. More specifically, the aftertreatment controller 216 is structured to determine the DOC 208 outlet temperature value via operative communication with the first temperature sensor 218, and to determine the SCR on filter 204 inlet temperature value via operative communication with the second temperature sensor 220.

At 404, an error between the SCR on filter 204 inlet temperature value and a SCR on filter target regeneration value is calculated or otherwise determined. The SCR on filter target regeneration value may be a temperature at which the SCR on filter undergoes active regeneration.

At 406, a DOC 208 outlet target temperature is dynamically adjusted so as to minimize the error calculated at 404. Finally, at 408, HC dosing from the HC doser 212 is controlled so as to cause the DOC 208 outlet temperature to equal the DOC 208 outlet target temperature.

It should be noted that the processes of the methods described herein may be utilized with the other methods, although described in regard to a particular method. It should further be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

Example and non-limiting module implementation elements include sensors (e.g., coupled to the components and/or systems in FIGS. 1 and 2) providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine-readable medium for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices.

Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in machine-readable medium (or computer-readable medium), the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A system, comprising:
    an oxidation catalyst configured to receive exhaust gas from an engine;
    a selective catalytic reduction catalyst on filter (SCR on filter) positioned downstream of the oxidation catalyst;
    a hydrocarbon doser configured to inject hydrocarbons into a flow of the exhaust gas upstream of the oxidation catalyst;
    a reductant doser configured to inject reductant into the flow of exhaust gas upstream of the SCR on filter and downstream of the oxidation catalyst;
    an aftertreatment controller operatively coupled to the hydrocarbon doser, the aftertreatment controller configured to control a dosing rate at which the hydrocarbon doser injects hydrocarbons into the flow of exhaust gas to cause regeneration of the SCR on filter;
    a temperature sensor positioned proximate an inlet of the SCR on filter, the temperature sensor in operative communication with the aftertreatment controller;
    wherein the aftertreatment controller is further configured to:
        determine a temperature measurement value via operative communication with the temperature sensor,
        determine an error between the temperature measurement value and an SCR on filter target regeneration temperature, and
        adjust an oxidation catalyst outlet target temperature to minimize the error.

2. The system of claim 1, further comprising an additional temperature sensor positioned proximate an outlet of the oxidation catalyst, the additional temperature sensor in operative communication with the aftertreatment controller;
    wherein the aftertreatment controller is further configured to determine an additional temperature measurement value via operative communication with the additional temperature sensor.

3. The system of claim 2, wherein the aftertreatment controller is further configured to:
    determine a third temperature measurement value via operative communication with the temperature sensor, the third temperature measurement value equal to the additional temperature measurement value,
    determine a lag time between a first time at which the additional temperature measurement value is determined and a second time at which the third temperature measurement value is determined, and
    determine a reductant deposit value based on the lag time.

4. The system of claim 2, wherein the dosing rate of the hydrocarbon doser is controlled to cause the additional temperature measurement value to equal the oxidation catalyst outlet target temperature.

5. The system of claim 4, wherein the dosing rate of the hydrocarbon doser is further based on a mass flow rate of the flow of the exhaust gas.

6. The system of claim 5, wherein the dosing rate of the hydrocarbon doser is further based on an ambient temperature.

7. The system of claim 1, wherein the reductant comprises diesel exhaust fluid.

8. The system of claim 1, wherein the hydrocarbon doser is configured to inject the hydrocarbons into a cylinder of the engine.

9. The system of claim 1, wherein the aftertreatment controller is further configured to detect a formation of solid reductant deposits within the exhaust aftertreatment system.

10. The system of claim 1, further comprising:
    a first delta pressure sensor positioned across the SCR on filter, the first delta pressure sensor in operative communication with the aftertreatment controller;
    wherein the aftertreatment controller is further configured to:
        determine a first delta pressure measurement value via operative communication with the first delta pressure sensor, and
        determine a soot loading value based on the first delta pressure measurement value.

11. The system of claim 10, further comprising:
    a second delta pressure sensor positioned across a portion of the exhaust aftertreatment system containing the reductant doser, the second delta pressure sensor in operative communication with the aftertreatment controller;
    wherein the aftertreatment controller is further configured to:
        determine a second delta pressure measurement value via operative communication with the second delta pressure sensor, and
        determine a reductant deposit value based on the second delta pressure measurement value.

12. The system of claim 1, wherein the hydrocarbon doser comprises a fuel injector of the engine, which is configured to inject a dose of the hydrocarbons into a cylinder of the engine after primary combustion has occurred.

13. An aftertreatment controller for an exhaust aftertreatment system, the aftertreatment controller comprising:
    a filter regeneration circuit configured to:
        determine a first temperature measurement value via operative communication with a first temperature sensor, and a second temperature measurement value via operative communication with a second temperature sensor, the first temperature sensor positioned proximate an outlet of an oxidation catalyst, the second temperature sensor positioned proximate an inlet of an SCR on filter;
        determine an error between the second temperature measurement value and an SCR on filter target regeneration temperature;

adjust an oxidation catalyst outlet target temperature to minimize the error; and control a dosing rate at which a hydrocarbon doser injects hydrocarbons into a flow of exhaust gas to cause regeneration of the SCR on filter based on the adjusted oxidation catalyst outlet target temperature.

14. The aftertreatment controller of claim 13, further comprising a diesel exhaust fluid (DEF) deposit detection circuit configured to:
   determine a third temperature measurement value via operative communication with the second temperature sensor, the third temperature measurement value equal to the first temperature measurement value,
   determine a lag time between a first time at which the first temperature measurement value is determined and a second time at which the third temperature measurement value is determined, and
   determine a reductant deposit value based on the lag time.

15. The aftertreatment controller of claim 13, wherein the dosing rate of the hydrocarbon doser is controlled to cause the first temperature measurement value to equal the oxidation catalyst outlet target temperature.

16. The aftertreatment controller of claim 13, wherein the dosing rate of the hydrocarbon doser is further based on a mass flow rate of the flow of the exhaust gas.

17. The aftertreatment controller of claim 13, wherein the dosing rate of the hydrocarbon doser is further based on an ambient temperature.

18. The aftertreatment controller of claim 13, further comprising a soot load circuit configured to:
   determine a first delta pressure measurement value via operative communication with a first delta pressure sensor, the first delta pressure sensor positioned across the SCR on filter; and
   determine a soot loading value based on the first delta pressure measurement value.

19. The aftertreatment controller of claim 18, further comprising a diesel exhaust fluid (DEF) deposit detection circuit configured to:
   determine a second delta pressure measurement value via operative communication with a second delta pressure sensor, the second delta pressure sensor positioned across a portion of the exhaust aftertreatment system containing a reductant doser; and
   determine a reductant deposit value based on the second delta pressure measurement value.

20. A system, comprising:
   an oxidation catalyst configured to receive exhaust gas from an engine;
   a selective catalytic reduction catalyst on filter (SCR on filter) positioned downstream of the oxidation catalyst;
   a hydrocarbon doser configured to inject hydrocarbons into a flow of the exhaust gas upstream of the oxidation catalyst;
   a first temperature sensor positioned proximate an outlet of the oxidation catalyst;
   a second temperature sensor positioned proximate an inlet of the SCR on filter; and
   an aftertreatment controller operatively coupled to the hydrocarbon doser, the first temperature sensor and the second temperature sensor, the aftertreatment controller configured to:
      determine a first temperature measurement value via operative communication with the first temperature sensor, and a second temperature measurement value via operative communication with the second temperature sensor;
      determine an error between the second temperature measurement value and an SCR on filter target regeneration temperature;
      adjust an oxidation catalyst outlet target temperature to minimize the error; and
      control a dosing rate at which the hydrocarbon doser injects hydrocarbons into the flow of exhaust gas to cause regeneration of the SCR on filter based on the adjusted oxidation catalyst outlet target temperature.

21. The system of claim 20, further comprising:
   a first delta pressure sensor positioned across the SCR on filter, the first delta pressure sensor in operative communication with the aftertreatment controller; and
   a second delta pressure sensor positioned across a portion of the exhaust aftertreatment system containing a reductant doser, the second delta pressure sensor in operative communication with the aftertreatment controller;
   wherein the aftertreatment controller is further configured to:
      determine a first delta pressure measurement value via operative communication with the first delta pressure sensor,
      determine a soot loading value based on the first delta pressure measurement value,
      determine a second delta pressure measurement value via operative communication with the second delta pressure sensor, and
      determine a reductant deposit value based on the second delta pressure measurement value.

* * * * *